(12) United States Patent
Shifren et al.

(10) Patent No.: US 9,715,965 B2
(45) Date of Patent: Jul. 25, 2017

(54) ELECTRICAL COMPONENT WITH RANDOM ELECTRICAL CHARACTERISTIC

(71) Applicant: ARM Limited, Cambridge (GB)

(72) Inventors: Lucian Shifren, San Jose, CA (US); Vikas Chandra, San Jose, CA (US); Mudit Bhargava, Austin, TX (US)

(73) Assignee: ARM Limited, Cambridge (GB)

( * ) Notice: Subject to any disclaimer, the term of this patent is extended or adjusted under 35 U.S.C. 154(b) by 150 days.

(21) Appl. No.: 14/488,647

(22) Filed: Sep. 17, 2014

(65) Prior Publication Data

US 2016/0078999 A1 Mar. 17, 2016

(51) Int. Cl.
| | | |
|---|---|---|
| *H01C 7/00* | (2006.01) | |
| *H01G 4/005* | (2006.01) | |
| *H01C 17/00* | (2006.01) | |
| *H01C 1/14* | (2006.01) | |
| *H01G 4/33* | (2006.01) | |
| *H01C 17/065* | (2006.01) | |
| *G09C 1/00* | (2006.01) | |
| *H01G 4/08* | (2006.01) | |
| *H01G 4/14* | (2006.01) | |
| *H04L 9/08* | (2006.01) | |

(52) U.S. Cl.
CPC ............... *H01G 4/005* (2013.01); *G09C 1/00* (2013.01); *H01C 1/14* (2013.01); *H01C 7/006* (2013.01); *H01C 17/00* (2013.01); *H01C 17/06586* (2013.01); *H01G 4/08* (2013.01); *H01G 4/14* (2013.01); *H01G 4/33* (2013.01); *H04L 9/0866* (2013.01); *H04L 2209/12* (2013.01)

(58) Field of Classification Search
CPC .......... H01G 4/005; H01C 17/00; H01C 1/14
USPC .......................................................... 338/13
See application file for complete search history.

(56) References Cited

U.S. PATENT DOCUMENTS

| | | | |
|---|---|---|---|
| 7,741,721 B2 * | 6/2010 | Black ................. | H01L 21/0337 257/773 |
| 8,168,284 B2 * | 5/2012 | Nealey .................. | B01D 69/10 427/256 |
| 8,285,767 B2 * | 10/2012 | Chandra ................ | G06F 7/588 708/251 |

(Continued)

FOREIGN PATENT DOCUMENTS

| | | |
|---|---|---|
| JP | 2006-293721 | 10/2006 |
| WO | 2014/023589 | 2/2014 |

OTHER PUBLICATIONS

International Search Report and Written Opinion of the International Searching Authority dated Nov. 20, 2015 in PCT/GB2015/052588, 14 pages.

(Continued)

*Primary Examiner* — Kyung Lee
(74) *Attorney, Agent, or Firm* — Nixon & Vanderhye P.C.

(57) ABSTRACT

An electrical component is formed with a directed self assembly portion having a random electrical characteristic, such as resistance or capacitance. The random pattern can be produced by using a directed self assembly polymer with guide structures 2 including randomness inducing features. The electrical components with the random electrical characteristics may be used in electrical circuits relying upon random variation in electrical characteristics, such as physically unclonable function circuitry. The electrical components may be resistors and/or capacitors.

12 Claims, 8 Drawing Sheets randomness inducing feature size manufacturing tolerance size disordered behaviour in all directions

(56) References Cited

U.S. PATENT DOCUMENTS

| | | | |
|---|---|---|---|
| 8,377,783 B2* | 2/2013 | Shifren | H01L 27/0921 257/376 |
| 8,491,965 B2* | 7/2013 | Cheng | B05D 5/02 156/246 |
| 8,618,221 B2* | 12/2013 | Nealey | B81C 1/00031 525/280 |
| 8,623,493 B2* | 1/2014 | Nealey | B01D 69/10 427/256 |
| 8,759,976 B2* | 6/2014 | Edelstein | H01L 23/52 257/758 |
| 2002/0158342 A1* | 10/2002 | Tuominen | B82Y 10/00 257/784 |
| 2006/0134556 A1 | 6/2006 | Nealey et al. | |
| 2008/0157314 A1 | 7/2008 | Clevenger et al. | |
| 2009/0035668 A1 | 2/2009 | Breyta et al. | |
| 2012/0009390 A1 | 1/2012 | Yang et al. | |
| 2012/0080404 A1 | 4/2012 | Lee et al. | |
| 2012/0116007 A1 | 5/2012 | Gopalan et al. | |
| 2013/0209755 A1 | 8/2013 | Hustad et al. | |
| 2014/0042628 A1 | 2/2014 | Edelstein et al. | |

OTHER PUBLICATIONS

Q. Li et al, "Self-assembled nanowire array capacitors: capacitance and interface state profile" *Nanotechnology*, vol. 25, No. 13, Feb. 28, 2014, pp. 1-6.

* cited by examiner

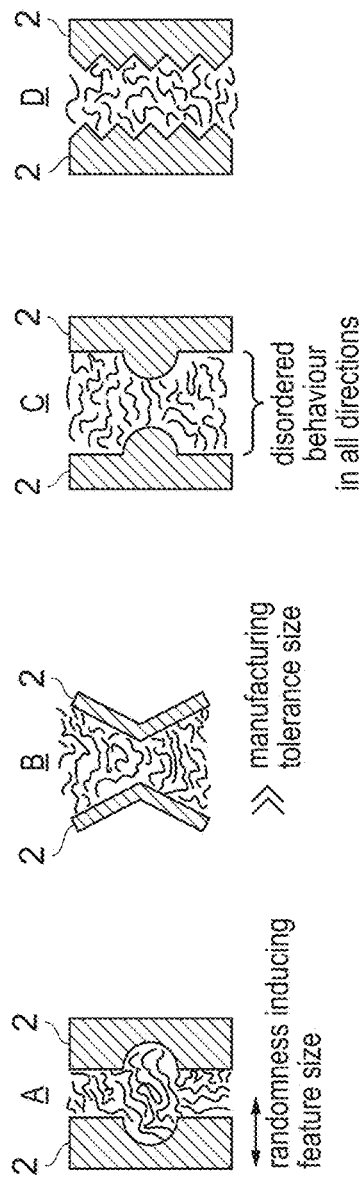
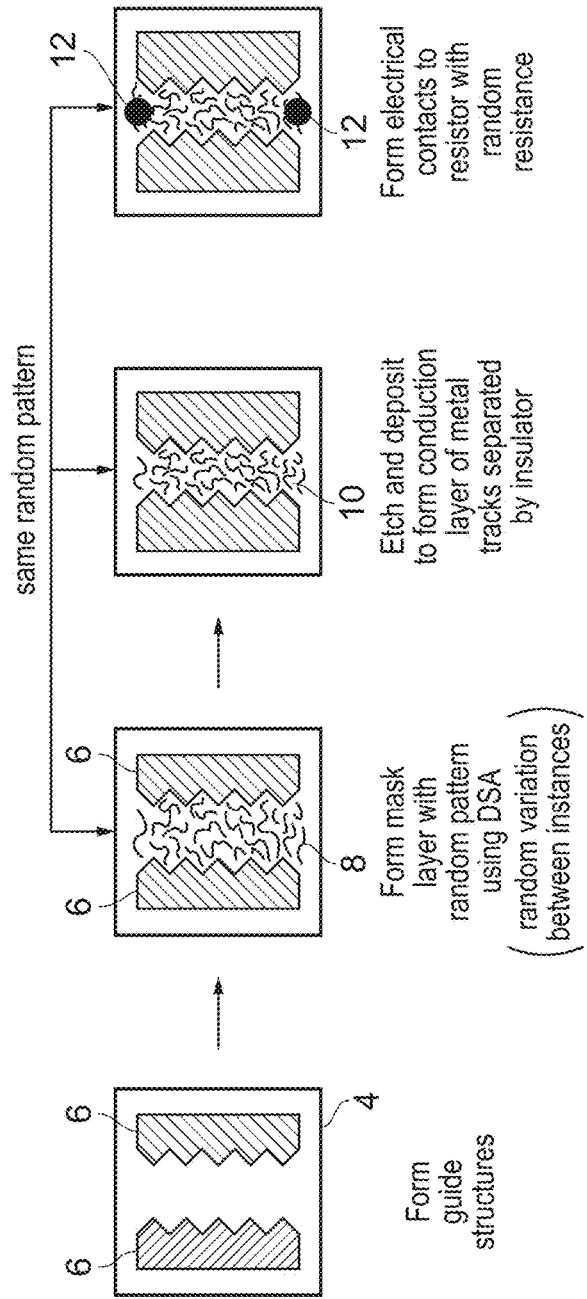

Random Capacitance

Random Resistance ary of manufacturing variations and is discarded and such masks are optically identified and discarded before further processing.

ELECTRICAL COMPONENT WITH RANDOM ELECTRICAL CHARACTERISTIC

BACKGROUND

This disclosure relates to the field of electrical components. More particularly, this disclosure relates to electrical components to provide a random electrical characteristic.

It is known to use directed self assembly (DSA) techniques in forming structures for integrated circuits. These techniques are used to form masks comprising a regular arrangement of parallel lines.

SUMMARY

Viewed from one aspect the present disclosure provides an electrical component having a portion with a shape corresponding to a random pattern to give said electrical component a random electrical characteristic.

The present disclosure recognises that the random patterns which can be produced in directed self assembly may in fact not constitute a manufacturing process failure, but instead be suited to producing electrical components having a random electrical characteristic. In particular, the pattern when formed will statistically be highly likely to be unique between instances. Furthermore, the pattern itself is a parameter which can control an electrical characteristic and yet will not change during operation. This contrasts with other parameters of an electrical component which may impose a degree of randomness on an electrical characteristic, but which are subject to change during operation, e.g. parameters such as carrier mobility which may be temperature dependent in a way that the electrical characteristics are not stable during operation. The present techniques are able to produce an electrical component which has a random electrical characteristic and maintains that random electrical characteristic during operation.

Viewed from another aspect the present disclosure provides a method of forming an electrical component with a random electrical characteristic comprising the step of forming at least a portion of said electrical component with directed self assembly to have a shape corresponding to a random pattern.

Viewed from another aspect the present disclosure provides an electrical component comprising: at least one guide structure; and a directed self assembly portion with a shape controlled by said at least one guide structure, wherein said at least one guide structure has one or more randomness inducing features with a size greater than a manufacturing tolerance size for said guide.

The above, and other objects, features and advantages of this invention will be apparent from the following detailed description of illustrative embodiments which is to be read in connection with the accompanying drawings.

BRIEF DESCRIPTION OF THE DRAWINGS

Example embodiments will now be described, by way of example only, with reference to the accompanying drawings in which:

FIG. 3 schematically illustrates different forms of guide structures having randomness inducing features to induce formation of a direct self assembly portion with disordered behaviour in all directions;

FIG. 4 schematically illustrates the formation of a resister with a random resistance;

DESCRIPTION OF EXAMPLE EMBODIMENTS

Figure 1:
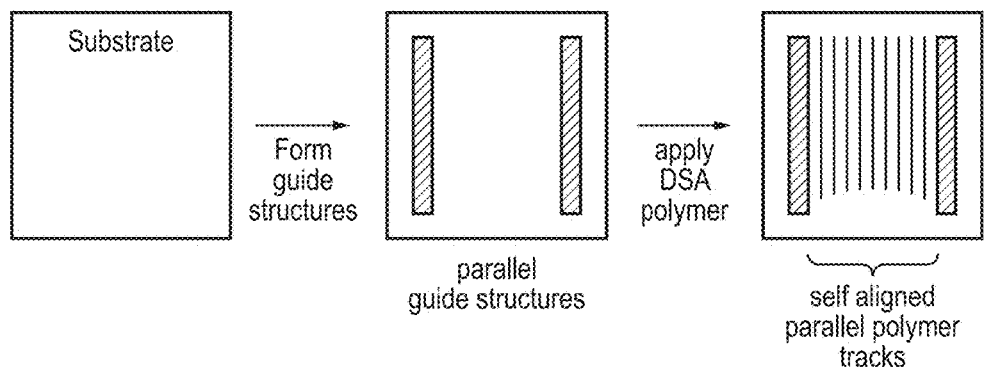
FIG. 1 schematically illustrates forming self aligned parallel polymer tracks using DSA.

FIG. 1 of the accompanying drawings schematically illustrates the use of DSA to form self aligned parallel polymer tracks between two guide structures. It is desired to produce an array of closely spaced parallel lines of polymer which can then be used as a pattern/mask to manufacture circuits such as finFETs. Conventional optical techniques for forming patterns run into difficulties as the geometries become smaller and accordingly such self-aligned parallel polymer tracks formed using DSA techniques are an attractive option.

Figure 2:
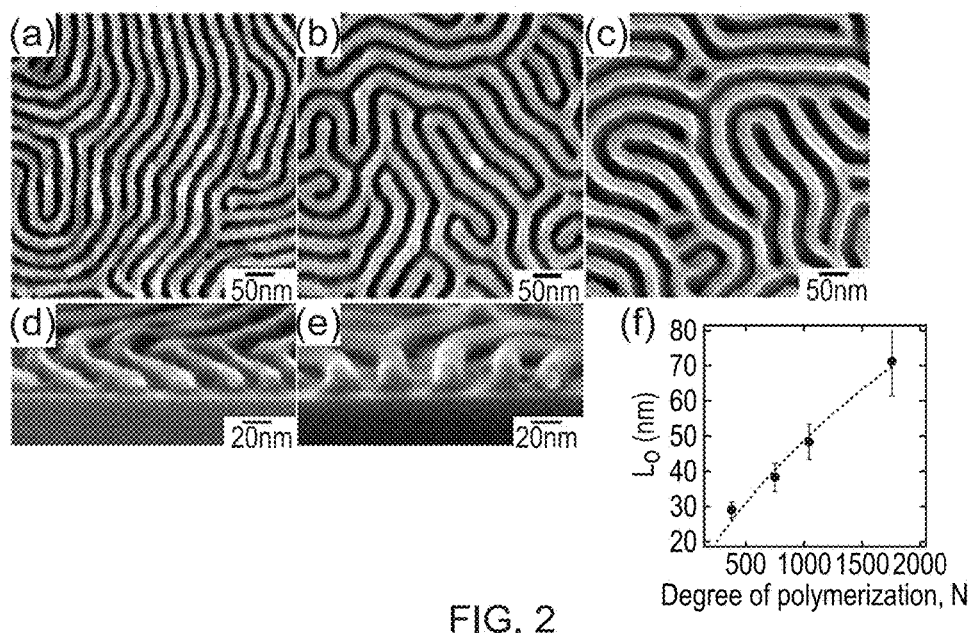
FIG. 2 schematically illustrates example random patterns which may be produced by DSA.

One difficulty with the techniques illustrated in FIG. 1 is that imperfections in the guide structures (e.g. misalignment, rough/uneven edges, etc) can prevent the desired self aligned parallel polymer tracks from forming and instead random patterns such as those illustrated in FIG. 2 of the accompanying drawings may be produced. A random pattern such as those illustrated in FIG. 2 is normally considered to represent a manufacturing process failure and such masks are optically identified and discarded before further processing.

It will be appreciated that an electrical component using the present techniques may have a variety of different forms. One example form is a resistor and in this case the random electrical characteristic is the resistance of the resistor. Another possibility for the electrical component is a capacitor, in which case the random electrical characteristic is the capacitance of the capacitor. It will be further appreciated that it is possible to form an electrical component which has both resistance and capacitance which vary in dependence upon the random pattern.

In the case of a resistor, the portion formed with a shaped corresponding to the random pattern (with a shape having characteristics determined by directed self assembly) may comprise a conductor layer between electrical contacts. This conductor layer may comprise tracks of conductive material having the random pattern and separated by tracks of less conductive material (e.g. metal tracks separated by insulator). The directed self assembly of a pattern can be used as a mask which determines the shape in which the tracks of metal (or insulator) will be formed. The tracks with a random pattern may form, for example in the case of a resistance, the contacts to a resistance, the resistance body itself or both so as to yield the random resistance value.

In the case where the electrical component is a capacitor, the portion with a shape corresponding to the random pattern may comprise an insulator layer between capacitor electrodes. In this case the insulator layer may comprise tracks of material having a first dielectric constant, the random pattern and separated by tracks of material having a second dielectric constant that is less than the first dielectric constant. The balance between the materials with the different dielectric constant and their disposition relative to the capacitor electrodes will determine the capacitance of the capacitor and give this a random value determined by the pattern formed by the directed self assembly. As with the resistance example, it is also possible that the electrodes, additionally or alternatively, may be formed with the random pattern so as to yield the random capacitance value.

It will be appreciated that the random patterns formed have characteristics significantly different from the self-aligned parallel polymer tracks which are the normal goal of the DSA techniques. In contrast to such self aligned parallel polymer tracks, the random pattern which is exploited by the present disclosure is a 2-dimensional pattern having a major plain and were the 2-dimensional pattern has substantially disordered behaviour measured in all directions within the major plain. It will be seen that the self aligned parallel polymer tracks has a highly ordered behaviour of a substantially constant periodicity as measured in a direction perpendicular to the tracks and no periodicity (an infinite period) measured parallel to the tracks (i.e. no tracks are crossed). In contrast, it can be seen from FIG. 2 that the random patterns generated by some outcomes of DSA have a disordered behaviour when measured in all directions (e.g. a periodicity measured in all directions). A property of the random patterns when the influence of boundary constraints at the edges of the patterns is removed is that they can have a uniform periodicity measured in any direction.

It will be appreciated that the normal design goal when producing electrical components is that they should have well defined and constant electrical characteristics between different instances of those electrical components. This is desirable in being able to reliably produce complex electrical circuits. However, the present disclosure recognises that true and stable randomness in an electrical characteristic of an electrical component that may be of significant benefit in certain electrical circuits. Such circuits can generate an operating characteristic control by the random electrical characteristic and accordingly yield a truly random (between instances) and yet stable operating characteristic that can be difficult to achieve. One particular example of such a use in providing physically uncloneable function circuitry (which may be beneficial in applications such as cryptography).

It will be appreciated that the guide structures used to guide (seed/control) the directed self assembly can have a variety of different forms. In conventional DSA techniques the manufacturing tolerances of such guide structures are controlled so as to form the guide structures in a manner in which the desired aligned parallel polymer tracks will be produced. In accordance with the present disclosure where a random pattern is the desired outcome, the guide structures can be formed to include one or more randomness inducing features. These randomness inducing features may be made large (e.g. with a size greater than the size of normal manufacturing tolerance) to ensure that a random pattern will be induced within the directed self assembly portion.

FIG. 3 of the accompanying drawings schematically illustrates various example forms of guide structure 2 which may be formed to produce a directed self assembly portion tween the guide structures 2 with a random pattern (e.g. disordered behaviour in all directions). These example guide structures have shapes differing significantly from the uniform parallel guide structures illustrated in FIG. 1. The randomness inducing features of the guide structures 2 of FIG. 3 combine with the physical characteristics of the DSA polymer layer serve to ensure that a random pattern will be formed. This random pattern may have a form, such as those illustrated in FIG. 2, in which the polymer forms tracks with gaps therebetween. These tracks in the random pattern may be used as a mask (or to form a mask) for in subsequent processing steps, such as etching or deposition. The random patterns are reminiscence of fingerprints and are statistically highly likely to be unique from instance to instance.

The degree of branching and merging within the tracks, the length of the tracks, the width of the tracks relative to their spacing and other characteristics of the random pattern can be varied in dependence upon the properties of the DSA polymer (e.g. polymer length, degree of polymerisation, physical characteristics of the polymer material) as well as the characteristics of the guide structures. By varying in these parameters used in forming the self assembly portion the directed self assembly portion can be given a pattern which can result in a random electrical characteristic of a subsequently formed electrical component with a desired distribution (e.g. a desired mean value and distribution width/shape).

FIG. 4 schematically illustrates formation of a resistor with a random resistance. A substrate 4 has guide structures 6 formed thereon. A directed self assembly polymer layer is then introduced between the guide structures 6 and serves to form a random pattern 8. Once formed, this random pattern is stable. The random pattern form shows random variations between different instances of the random resistor which are manufactured. The technique for forming such a directed self assembly polymer layer will be familiar to those in this technical field.

The random pattern formed by the directed self assembly polymer is then used to etch and/or deposit further layers so as to form a conductor layer 10 of metal tracks separated by insulator (which could be one or more of a variety of non-conductive materials (including air)). Electrical contacts 12 are then formed contacting the conductor layer with the random pattern so as to yield a resistor with a random resistance.

Figure 5:
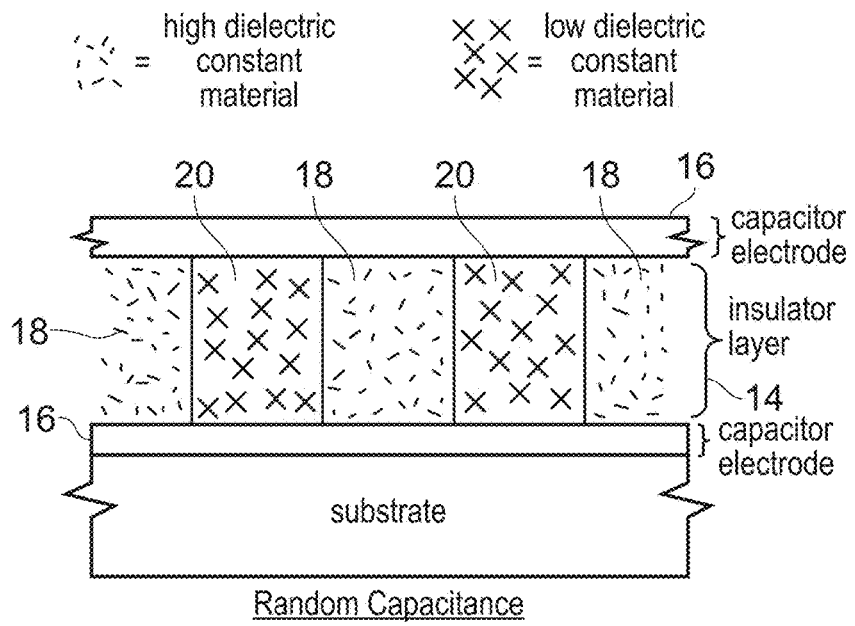
FIG. 5 schematically illustrates a cross-section through a random capacitance.

FIG. 5 schematically illustrates a cross-section through a capacitor formed to have a random capacitance in accordance with the present disclosure. The capacitor includes a insulator layer 14 disposed between capacitor electrodes 16. The insulator layer 14 is formed of tracks of material 18 having a high dielectric constant and tracks of material 20 having a low dielectric constant. The balance and shape of these two different forms of material and their positioning relative to the capacitor electrodes 16 controls the capacitance value of the capacitor formed. This capacitance has a random value dependent upon the pattern which was generated by the directed self assembly. It is also possible that alternatively, or additionally, the capacitor electrodes 16 could be formed with a random pattern so as to yield a random capacitance value.

Figure 6:
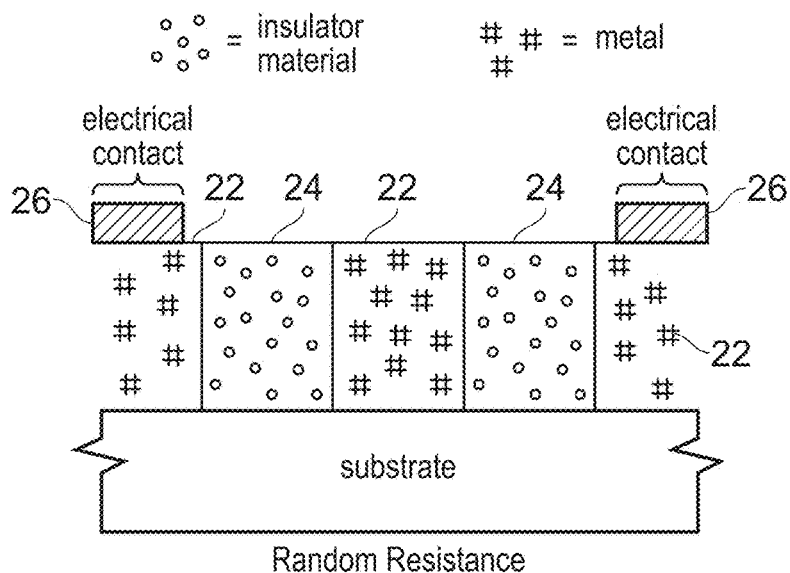
FIG. 6 schematically illustrates a cross-section through a random resistance.

FIG. 6 schematically illustrates a cross-section through a resistor having a random resistance. The resistor is formed with tracks of metal 22 spaced by tracks of insulating material 24. Electrical contacts 26 provide the terminals to the resistor. The shape, disposition and relative amounts of the insulator material 24 and metal material 22 between the electrical contact 26 determines the resistance value between the context 26. Thus, the random pattern produces a random resistance value.

Figure 7:
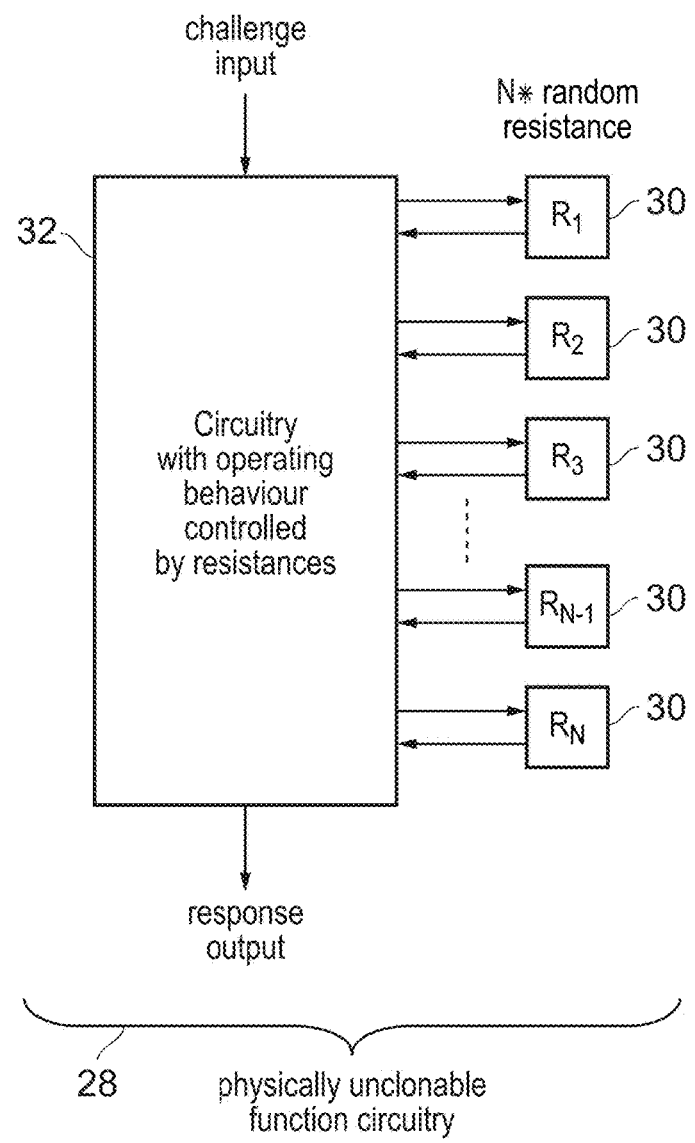
FIG. 7 schematically illustrates physically unclonable function circuitry with operating behaviour controlled by random resistances.

FIG. 7 schematically illustrates an example of an electrical circuit which can exploit the provision of electrical components with a random electrical characteristic. In this example, the electrical circuit comprises physically unclonable function circuitry 28 which receives a challenge input and generates a response output in dependence upon the challenge input. The form of the response output for a given challenge input is controlled by the values of respective random resistances 30 which control the operating behaviour of the response generating circuitry 32. The random resistances 30 will have values which are quasi-unique between different instances of the physically unclonable function circuitry 28 and accordingly provide a mapping between a challenge input and a response output which is also quasi-unique in a manner useful in fields such as cryptography. It will be appreciated that the physically unclonable function circuitry 28 may have a wide variety of different forms. It is possible that the operation of the physically unclonable function circuitry 28 may be controlled by capacitors with random capacitances rather than resistors with random resistances. The physically unclonable function circuitry 28 could also be controlled by combinations of resistors and capacitors with random electrical characteristics.

Figure 8:
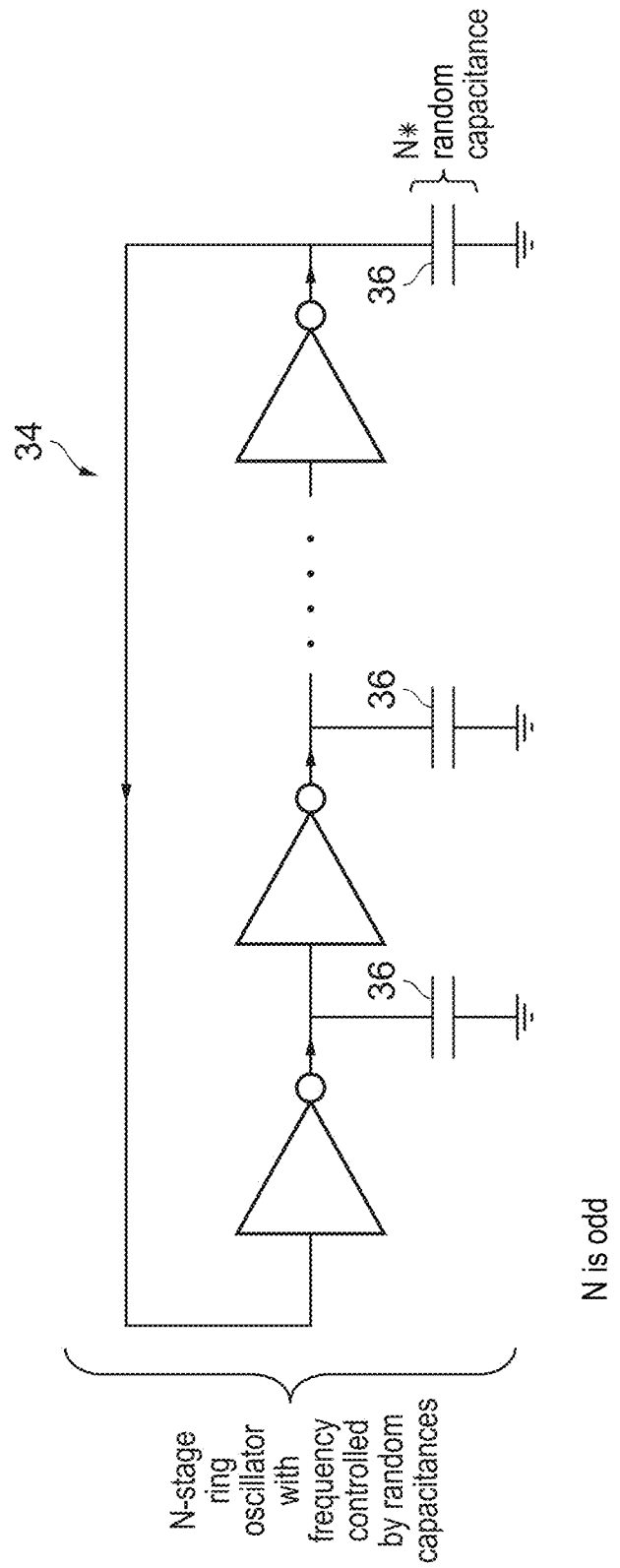
FIG. 8 schematically illustrates an N-stage ring oscillator with a oscillation frequency controlled by random capacitances.

FIG. 8 is an example of a further electrical circuit having operating characteristics controlled by the electrical characteristic of an electrical component, in this case a capacitor. The example circuit is a ring oscillator 34 composed of an odd number of an inverter stages with feedback from the final inverter stage to the first inverter stage. A capacitor 36 with a random capacitance value is disposed at the output of each inverter stage and serves to provide that a random delay is introduced by each inverter stage in the ring oscillator. Accordingly, the oscillation frequency of the ring oscillator is controlled by the capacitances of the capacitors 36, which are themselves controlled by the random patterns which were used in their formation. The random patterns do not vary after manufacture and accordingly the random variation in the oscillation frequency of the ring oscillator 34 will show good stability over varying operating parameters, such as temperature, operating voltage, humidity etc.

Figure 9:
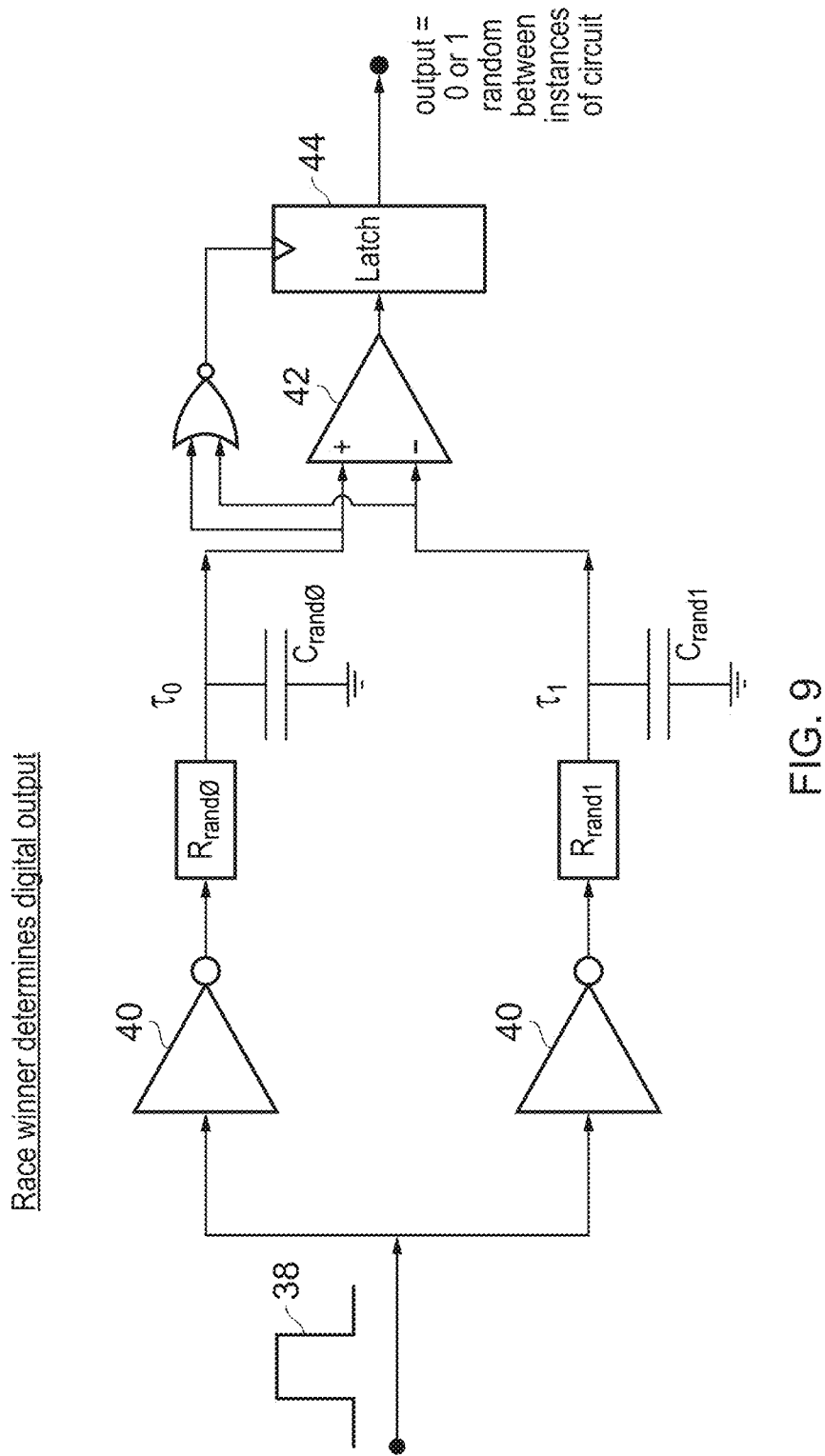
FIG. 9 schematically illustrates a circuit for producing a digital output which is randomly a 0 or a 1 between instances of the circuit.

FIG. 9 schematically illustrates a further example circuit utilising electrical components having a random electrical characteristic. In this case the circuit generates either a "0" or a "1" value in a manner which is random between instances of the circuit, but constant for a given instance of the circuit. The circuit operates by setting up a race condition for propagation of a received pulse 38 which is passed through two inverters 40 and respective RC circuits to an amplifier 42. The time constant of the two RC circuits are controlled by the random resistance and capacitance values of the electrical components formed with the random patterns as previously discussed. Depending upon the relative values of the two time constants for the different paths, one of the paths will be faster than the other. The outputs of the faster of the two paths reaches the amplifier 42 first and accordingly drives the output from this amplifier either high or low, with this then being stored within a latch 44.

Figure 10:
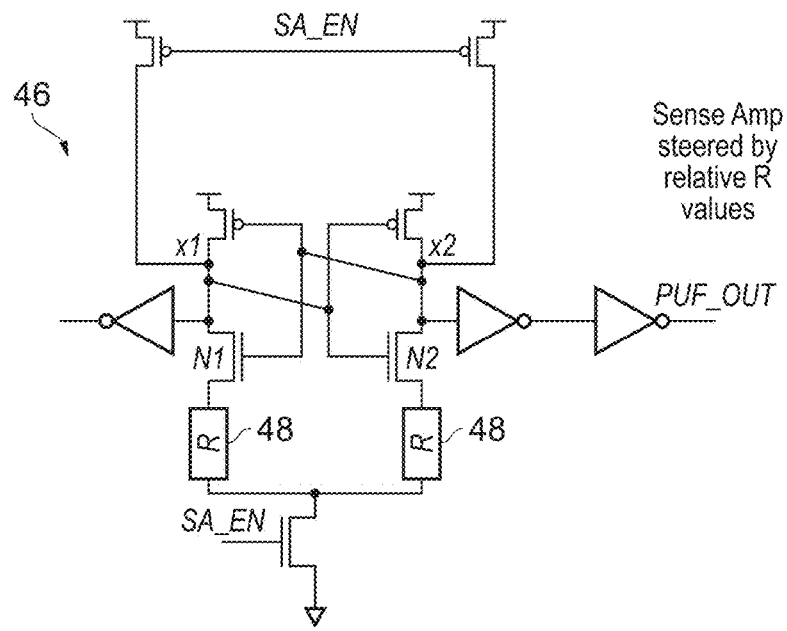
FIG. 10 schematically illustrates a sense amplifier steered by relative resistance values.

FIG. 10 schematically illustrates a further example of circuitry with an operating characteristic control by a random electrical characteristic of an electrical component. In this case the circuitry comprises a sense amplifier 46 which is steered by the relative values of two resistances 48. These resistances can be formed using the random patterns as previously discussed. Depending upon which of the resistances 48 has the higher or lower resistance, the output from the sense amplifier will consistently be either high or low for a given instance of the sense amplifier circuitry 46. As will be understood by those in this technical field, sense amplifiers are well suited to picking up and amplifying small differences between electrical parameters in a fast and reliable fashion. Thus, what may be relatively small differences in the resistance values of the resistance 48 may be reliably sensed and used to steer the output of the sense amplifier to a constant value for a given instance of the sense amplifier 46.

Figure 11:
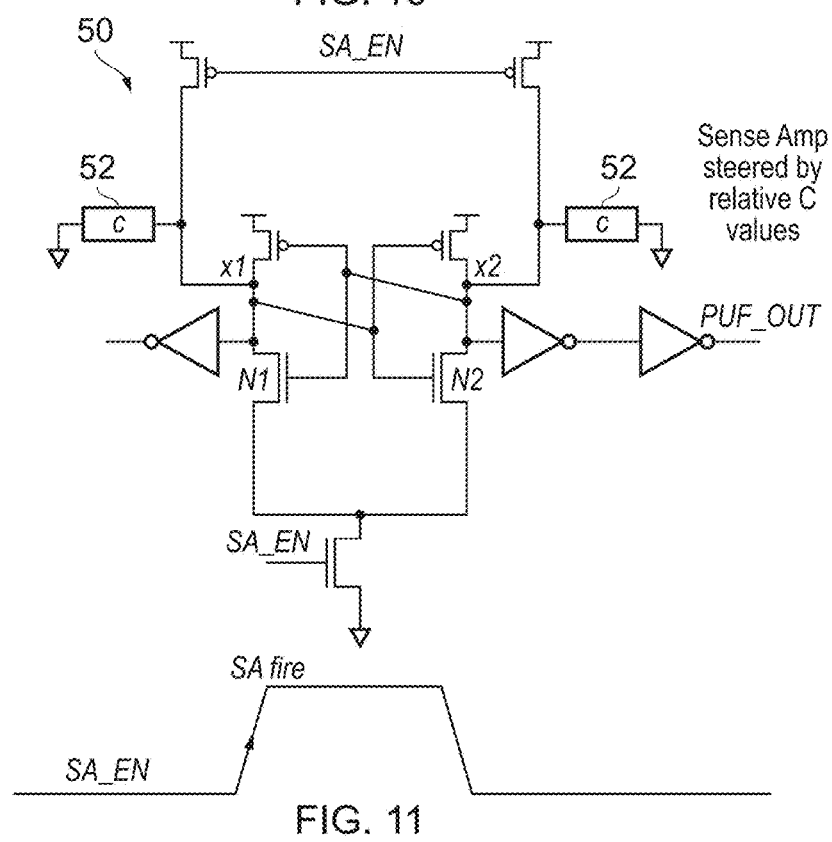
FIG. 11 schematically illustrates a sense amplifier steered by relative capacitance values.

FIG. 11 schematically illustrates a further example of electrical circuitry with an operating characteristic control by a random electrical characteristic. In this case the electrical component having the random electrical characteristic is a capacitor 52 provided at each side of the sense amplifier. The relative capacitance values of the capacitors 52 determine whether the sense amplifier will generate a high output or a low output when it is enabled with the sense amplifier enable signal SA_EN.

As the resistance of the resistors 48 of FIG. 10 and the capacitance of the capacitors 52 of FIG. 11 are primarily controlled by the random patterns which were used during manufacture and are invariant after manufacture, the difference between the resistance values of the resistances 48 and the capacitances of the capacitors 52 will be relatively stable. Accordingly, the circuits of FIGS. 10 and 11 can be relied upon to continue to be steered in the same direction by the relative values of the resistances 48 or the relative values of the capacitances 52 despite variations in, for example, temperature, operating voltage, humidity or other parameters.

Figure 12:
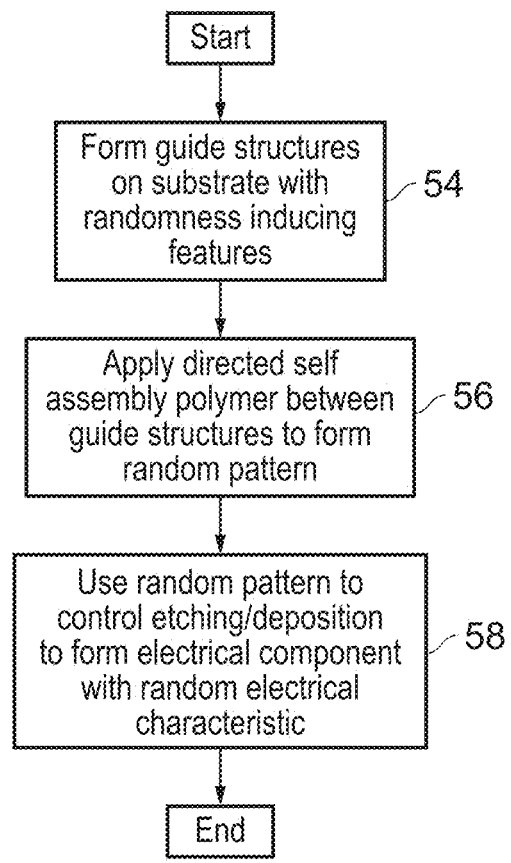
FIG. 12 is a flow diagram schematically illustrating the production of an electrical component with a random electrical characteristic dependent upon a random pattern produced by directed self assembly polymer.

FIG. 12 is a flow diagram schematically illustrating the formation of a electrical component. At step 54 guide structures are formed on a substrate including randomness inducing features, such as the curved portions, non-uniform spacing, zig-zags or other features as illustrated in FIG. 3. At step 56, the directed self assembly polymer is applied between the guide structures and forms the random pattern, such as illustrated in FIG. 2. At step 58, the random pattern formed at step 56 is used to control further manufacturing steps, such as etching/deposition to form an electrical component with a random electrical characteristic.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An electrical component comprising:
    at least one guide structure; and
    a directed self assembly portion with a shape controlled by said at least one guide structure, wherein
    said at least one guide structure has one or more randomness inducing features with a size greater than a manufacturing tolerance size for said guide.

2. An electrical component as claimed in claim 1, the electrical component having a portion with a shape corresponding to a random pattern to give said electrical component a random electrical characteristic.

3. An electrical component as claimed in claim 2, wherein said electrical component is a resistor and said random electrical characteristic is resistance.

4. An electrical component as claimed in claim 3, wherein said portion comprises a conductor layer between electrical contacts.

5. An electrical component as claimed in claim 4, wherein said conductor layer comprises tracks of conductive material having said random pattern separated by tracks of less conductive material.

6. An electrical component as claimed in claim 4, wherein said conductor layer is a metal conductor layer.

7. An electrical component as claimed in claim 2, wherein said electrical component is a capacitor and said random electrical characteristic is capacitance.

8. An electrical component as claimed in claim 7, wherein said portion comprises an insulator layer between capacitor electrodes.

9. An electrical component as claimed in claim 7, wherein said insulator layer comprises tracks of material having a first dielectric constant and said random pattern separated by tracks of material having a second dielectric constant that is less than said first dielectric constant.

10. An electrical component as claimed in claim 2, wherein said random pattern is a two-dimensional pattern having a major plane and said two-dimensional pattern has a substantially disordered behavior measured in at least one direction within said major plane.

11. An electrical component as claimed in claim 2, wherein said random pattern is a two-dimensional pattern having a major plane and said two-dimensional pattern has a substantially disordered behaviour measured in all directions within said major plane.

12. Apparatus comprising:
an electrical component as claimed in claim 2; and
circuitry coupled to said electrical component to generate an operating characteristic controlled by said random electrical characteristic.

* * * * *